Patented July 9, 1935

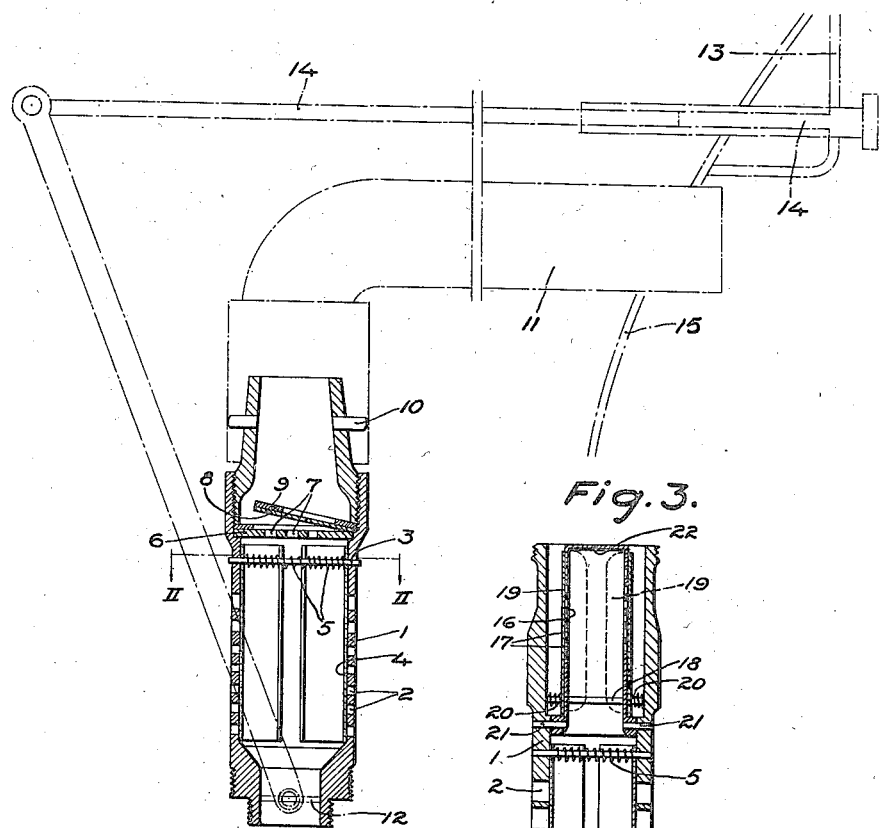
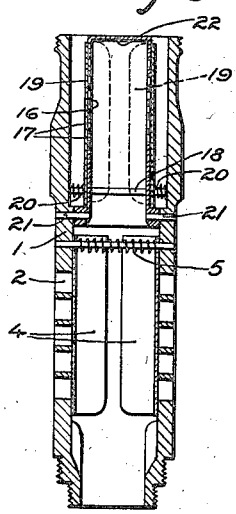
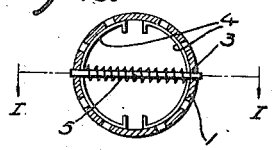

2,007,718

UNITED STATES PATENT OFFICE 2,007,718

VALVE FOR OBTAINING COMPRESSED AIR FROM THE COMPRESSION CHAMBER OF A MOTOR

Johan Edvin Jonsson, Stockholm, Ragnar Wilhelm Larsson, Appelviken, and Anders Johan Emil Rylander, Stockholm, Sweden Application March 17, 1934, Serial No. 716,182 In Sweden April 29, 1933

4 Claims. (Cl. 277—70)

The present invention relates to a valve adapted to be connected to the compression chamber of a motor in order to obtain compressed air from the said compression chamber, the said valve being arranged to suck in fresh air during the suction stroke of the piston of the motor through one or more inlet openings and during the pressure stroke of the piston of the motor to lead away the same under pressure by means of one or more outlet openings, the inlet and outlet openings being arranged to be alternately closed and opened by means of valve members disposed in the valve casing. Previously several attempts have been made in vain to obtain such a valve, the main purpose of which is to be used at inflating the inner tubes of automobiles, but up to now no practical solution of the problem has appeared. The reason herefor in the first place has been to seek in the fact that in the valves constructed hitherto such valve members have been used, as have complicated the valve construction and due to the inertia of the said members they have not been able to work with the easiness and speed required. Furthermore the air has often been caused, both at suction and at leading away, to move in a path consisting of sharp turns, which has caused very troublesome formations of whirls. The present invention eliminates the above mentioned drawbacks. The valve according to the invention is substantially characterized by the fact that the valve members consist of flaps, which are swingably and/or displaceably disposed on one (or more) stationary shaft.

Two embodiments of the invention are illustrated in the accompanying drawing, in which Figures 1 and 2 refer to the valve according to one embodiment, Figure 1 showing a vertical section through the valve along the line I—I of Figure 2 and Figure 2 a horizontal section along the line II—II of Figure 1.

Figure 3 shows a vertical section through the valve according to the other embodiment.

In the drawing numeral 1 indicates the valve casing, which consists of a cylindrical sleeve, the walls of which are provided with a number of through holes 2 serving as inlet openings. At its lower end the said sleeve is on its outside provided with two threaded portions of different diameters, the latter being chosen with respect to the dimensions of the most common threaded bores for the spark plugs in automobile motors. In the embodiment shown in Figures 1 and 2 two flaps 4 are swingably and displaceably disposed on a shaft 3 extending in the transverse direction of the sleeve, the said flaps being adapted to rest airtight against the inner walls of the sleeve and serving as valve members for the inlet openings 2. A spring 5 tends to keep the flaps 4 slightly pressed against the walls of the sleeve 1. The outlet openings 7 provided in a wall 6 may be opened and closed by means of a steel membrane 8, which in the open position rests against a support 9. Two pins 10 serve as a support for a hose 11 or the like, which preferably is provided with a bayonet socket, the said hose being indicated only by dash-and-dot-lines.

The valve may either be screwed into a special hole provided in the cover of the motor or also be screwed into the bore, which serves to receive the spark plug. In the first mentioned case, in which the valve is meant to remain in the said hole all the time, the valve must be provided with a cock or the like, by means of which airtight closing of the lower end of the sleeve 1 may be obtained. The drawing indicates in dash-and-dot-lines a suitable way of closing the lower end of the sleeve 1 by means of a muffler 12, which may be actuated by means of a rod 14 from the instrument board 13 of an automobile, whereby the valve is put out of function. By the hose 11 connected with the valve also extending to the instrument board or to the wall 15 separating the driver's cabin and the motor room from each other compressed air may, when required, be taken out from the mouth of the hose, without it being necessary in such a case to raise the hood of the car, to put the valve into function.

In the embodiment illustrated in Figure 3 there is within the sleeve 1 constituting the valve casing a smaller, second sleeve 16, which replaces the partition 6 and which is provided partly with a bottom 22 partly with through openings 17, which serve as outlet openings and which thus correspond to the openings 7 in the embodiment according to Figures 1 and 2. The openings 17 may be opened and closed by means of flaps 19, which are swingable on a stationary shaft 18 and adapted to rest airtight against the external walls of the sleeve 16, the said flaps thus compensating for the membrane 8 in the embodiment according to Figures 1 and 2. The flaps 19 are kept slightly pressed against the external walls of the sleeve 16 by means of helical springs 20. Pins 21 serve for retaining the sleeve 16 in its position within the sleeve 1.

By the valve having been constructed in the above described way several advantages are obtained. So for example the compression chamber of the motor will receive a large contribution of fresh air by the possibility of making the total area of the inlet openings 2 very large. Nor do any troublesome formations of whirls arise in the present construction, which may reduce the capacity of the valve. By flaps 4, 19 and the steel membrane 8 being valve members, which may be easily actuated and work reliably, a very high efficiency is obtained in addition hereto, also at very low speeds of the motor. Furthermore the members constituting the valve being very simple to make and to join also the costs of manufacture become very low.

Having now described our invention, what we claim as new and desire to secure by Letters Patent is:

1. A valve adapted to be associated with the cylinder of an engine and arranged to draw in air through one or more inlet openings during the suction stroke of the motor piston and to lead away the said air under pressure through one or more outlet openings during the pressure stroke of the engine-piston, the inlet and outlet openings being arranged to be closed and opened alternately by means of valve members located in a valve casing which is in the form of a sleeve, characterized in that the inlet openings are controlled by elongated rigid metal flaps, which are swingably disposed at one end on a stationary shaft, extending in the transverse direction of the sleeve, the said flaps having a cross section corresponding to the interior cross section of the sleeve so as to make an airtight contact with the internal wall thereof.

2. A valve according to claim 1, characterized in that within the sleeve forming the valve casing there is provided a second but smaller sleeve, a wall for closing the end of the small sleeve remote from the inlet end of the first-mentioned sleeve, the small sleeve being provided with perforations which serve as outlet openings and additional elongated rigid metal flaps swingably mounted on a transverse axis for closing said outlet openings.

3. A valve according to claim 1, wherein the flaps are spring controlled and normally arranged in closing position.

4. A valve according to claim 1, characterized in that within the sleeve forming the valve casing there is provided a second but smaller sleeve, a wall for closing the end of the small sleeve remote from the inlet end of the first-mentioned sleeve, the small sleeve being provided with perforations which serve as outlet openings, additional elongated rigid metal flaps swingably mounted on a transverse axis for closing said outlet openings, and resilient means for normally holding all of the flaps in closed position.

JOHAN EDVIN JONSSON.
RAGNAR WILHELM LARSSON.
ANDERS JOHAN EMIL RYLANDER.